United States Patent
Izumi et al.

(10) Patent No.: US 9,908,815 B2
(45) Date of Patent: *Mar. 6, 2018

(54) HEAT-RESISTANT MEMBER AND METHOD FOR PRODUCING THE SAME

(71) Applicant: NGK Insulators, Ltd., Nagoya (JP)

(72) Inventors: Yunie Izumi, Nisshin (JP); Yoshimasa Kobayashi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 190 days.

This patent is subject to a terminal disclaimer.

(21) Appl. No.: 14/873,348

(22) Filed: Oct. 2, 2015

(65) Prior Publication Data

US 2016/0096775 A1    Apr. 7, 2016

Related U.S. Application Data

(60) Provisional application No. 62/059,221, filed on Oct. 3, 2014.

(51) Int. Cl.
| | | |
|---|---|---|
| *C04B 35/01* | (2006.01) | |
| *C04B 41/87* | (2006.01) | |
| *C04B 41/00* | (2006.01) | |
| *C04B 41/50* | (2006.01) | |
| *C04B 35/622* | (2006.01) | |
| *C04B 35/64* | (2006.01) | |
| *C23C 24/08* | (2006.01) | |

(52) U.S. Cl.
CPC ........ *C04B 35/01* (2013.01); *C04B 35/62222* (2013.01); *C04B 35/64* (2013.01); *C04B 41/009* (2013.01); *C04B 41/5036* (2013.01); *C04B 41/87* (2013.01); *C23C 24/085* (2013.01)

(58) Field of Classification Search
CPC ..... C04B 35/01; C04B 35/6222; C04B 35/64; C04B 41/009; C04B 41/5036; C04B 41/87; C23C 24/085
See application file for complete search history.

(56) References Cited

U.S. PATENT DOCUMENTS

| | | | |
|---|---|---|---|
| 4,629,662 A | 12/1986 | Brownlow et al. | |
| 6,890,665 B1 | 5/2005 | Tanida | |
| 8,137,802 B1 | 3/2012 | Loehman et al. | |
| 2011/0003083 A1* | 1/2011 | Yang et al. | A61F 2/30767 427/453 |
| 2012/0295183 A1* | 11/2012 | Yamanis et al. | C01G 51/00 429/510 |
| 2015/0344041 A1 | 12/2015 | Green | |
| 2016/0096341 A1* | 4/2016 | Izumi et al. | B32B 7/02 174/126.1 |
| 2016/0096342 A1* | 4/2016 | Izumi et al. | B32B 9/005 174/84 R |
| 2016/0099089 A1* | 4/2016 | Izumi et al. | H01B 13/0016 428/213 |

FOREIGN PATENT DOCUMENTS

| | | |
|---|---|---|
| DE | 223 803 A1 | 6/1985 |
| JP | 08-319582 A1 | 12/1996 |
| JP | 2009-293058 A1 | 12/2009 |

OTHER PUBLICATIONS

U.S. Office Action (Related U.S. Appl. No. 14/873,263) dated May 15, 2017.
F. Fernandes, et al., "Oxidation Behavior of Ni-Based Coatings Deposited by PTA on Gray Cast Iron," *Surface & Coatings Technology*, vol. 207, Aug. 1, 2012, pp. 196-203.
Extended European Search Report (Application No. 15188201.6) dated Feb. 4, 2016.
U.S. Appl. No. 14/873,263, filed Oct. 2, 2015, Izumi et al.
U.S. Appl. No. 14/873,311, filed Oct. 2, 2015, Izumi et al.
U.S. Appl. No. 14/873,327, filed Oct. 2, 2015, Izumi et al.
U.S. Appl. No. 14/873,291, filed Oct. 2, 2015, Izumi et al.

* cited by examiner

*Primary Examiner* — Nathan M Nutter
(74) *Attorney, Agent, or Firm* — Burr & Brown, PLLC

(57) ABSTRACT

A heat-resistant member includes a member that is a target to be protected and a protective layer arranged on the whole or part of a surface of the member. The protective layer includes an oxide ceramic containing an $Fe_3O_4$ phase in which a solute component capable of forming a spinel-type oxide with Fe is solid-dissolved.

12 Claims, 2 Drawing Sheets

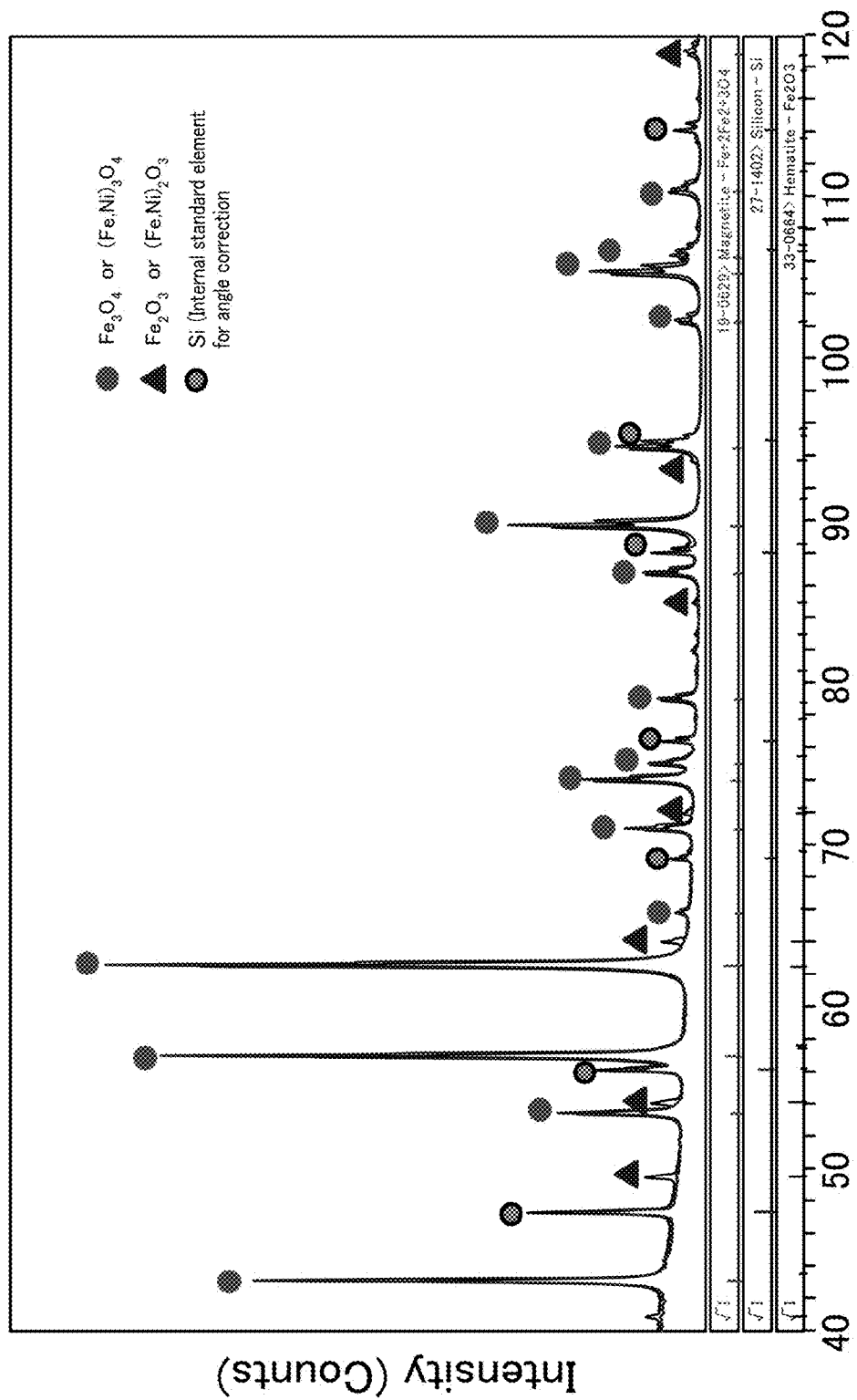

HEAT-RESISTANT MEMBER AND METHOD FOR PRODUCING THE SAME

The present application claims priority from U.S. provisional application No. 62/059,221, filed on Oct. 3, 2014, the entire contents of which are incorporated herein by reference.

BACKGROUND OF THE INVENTION

1. Field of the Invention

The present invention relates to a heat-resistant member and a method for producing the heat-resistant member.

2. Description of the Related Art

Hitherto, a member in which a first layer composed of a ceramic with a high thermal expansion coefficient and a second layer which is composed of a ceramic with a thermal expansion coefficient lower than that of the first layer and which has insulating properties are stacked on a surface of a metal in that order has been reported as a heat-resistant member (for example, see PTL 1). Even when the member is exposed to high temperatures or thermally shocked, delamination does not occur, and the metal is protected while the insulating properties are maintained at a good level. Furthermore, a member in which a second ceramic film with a relative density of 95% or more is stacked on a first ceramic film with a relative density of 95% or less has been reported as a heat-resistant member (for example, see PTL 2). The member has good heat resistance, resistance to thermal shock, and oxygen barrier properties, and the interfacial delamination between the layers is inhibited.

CITATION LIST

Patent Literature

PTL 1: JP 8-319582 A
PTL 2: JP 2009-293058 A

SUMMARY OF THE INVENTION

However, in the member disclosed in PTL 1, a ceramic powder composed of an oxide is formed on the surface of the metal. The member needs to be improved in view of that, for example, the adhesion between the metal surface and the first layer is not sufficient. In addition, the member is not used for applications that require electrical conductivity at high temperatures because of the insulating film formed on the metal. In the member disclosed in PTL 2, the ceramic films are formed by aerosol deposition and a plasma spray coating method. The process has many restrictions. Thus, the ceramic multilayer body is not easily produced. Furthermore, it is difficult to increase the film thickness, in some cases.

The present invention has been accomplished in light of the foregoing problems. It is a main object of the present invention to provide a heat-resistant member in which changes in properties are further reduced by a simpler method, and to provide the method for producing the heat-resistant member.

In order to achieve the main object, the inventors have conducted intensive studies and have found that when a metal powder is disposed on a surface of a metal member or a non-oxide ceramic and fired, a heat-resistant member in which changes in properties are reduced is produced by a simpler method. These findings have led to the completion of the present invention.

A heat-resistant member according to the present invention includes:

a member; and a protective layer arranged on the whole or part of a surface of the member, the protective layer including an oxide ceramic containing an $Fe_3O_4$ phase in which a solute component capable of forming a spinel-type oxide with Fe is solid-dissolved.

A method for producing a heat-resistant member according to the present invention includes:

a protective layer formation step of disposing a material on the whole or part of a surface of a member, the material containing an Fe metal powder and a solute component powder that contains a solute component capable of forming a spinel-type oxide with Fe, and performing firing in a temperature range lower than the melting point of an Fe oxide to form a protective layer composed of an oxide ceramic.

In the heat-resistant member and the method for producing the same according to the present invention, the member is covered with the oxide ceramic containing the $Fe_3O_4$ phase in which the solute component capable of forming a spinel-type oxide with Fe is solid-dissolved. In the oxide ceramic, $Fe_3O_4$ is thermally stable owing to the solute component. This further reduces changes in the properties of the member and the protective layer. In the method for producing the heat-resistant member, the Fe metal powder and the solute component powder containing the solute component capable of forming a spinel-type oxide with Fe are disposed on the member and then fired. It is thus possible to produce the protective layer-covered member by the simpler method.

BRIEF DESCRIPTION OF THE DRAWINGS

FIG. 4 illustrates the results of the X-ray diffraction measurement in Experimental Examples 3 and 4.

DETAILED DESCRIPTION OF THE INVENTION

Figure 1:
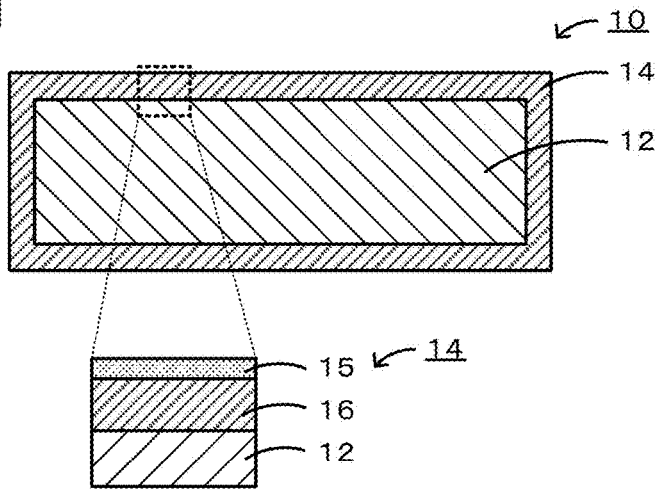
FIG. 1 is an explanatory drawing illustrating an example of a schematic structure of a heat-resistant member 10.
Figure 2:
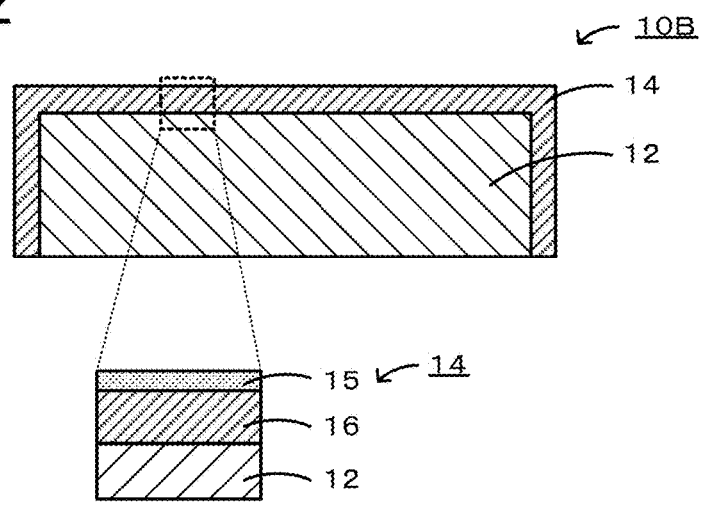
FIG. 2 is an explanatory drawing illustrating an example of a schematic structure of a heat-resistant member 10B.
Figure 3:
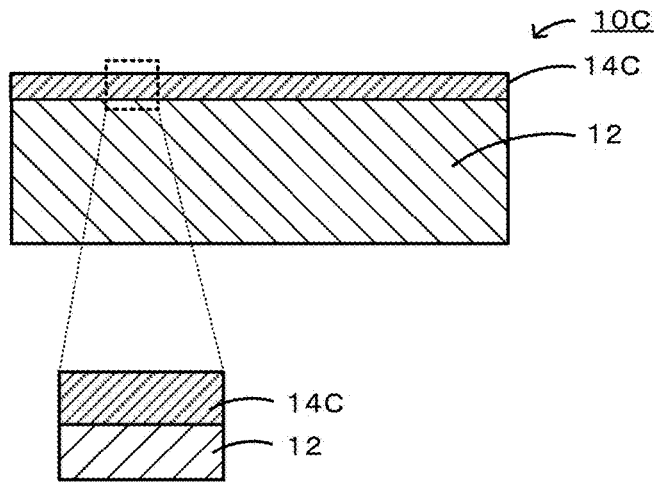
FIG. 3 is an explanatory drawing illustrating an example of a schematic structure of a heat-resistant member 10C.

Embodiments of the present invention will be described below with reference to the attached drawings. FIG. 1 is an explanatory drawing illustrating an example of a schematic structure of a heat-resistant member 10 according to an embodiment of the present invention. FIG. 2 is an explanatory drawing illustrating an example of a schematic structure of a heat-resistant member 10B. FIG. 3 is an explanatory drawing illustrating an example of a schematic structure of a heat-resistant member 10C.

The heat-resistant member 10 includes a member 12 that is a target to be protected and a protective layer 14 arranged on the whole or part of surfaces of the member 12, the protective layer 14 being composed of an oxide ceramic containing an $Fe_3O_4$ phase in which a solute component capable of forming a spinel-type oxide with Fe is solid-dissolved. As illustrated in FIG. 2, for example, the heat-resistant member 10B includes the member 12 and the protective layer 14 arranged on the side surfaces and the top surface (part) among the surfaces of the member 12, the protective layer 14 being composed of the oxide ceramic. As illustrated in FIG. 3, for example, the heat-resistant member 100 includes the member 12 and a protective layer 14C arranged on a surface (part) of the member 12, the protective layer 14C being composed of the oxide ceramic. That is, the protective layer 14 may be arranged on the whole or part of the surfaces of the protected member 12. In each of the heat-resistant members 10 and 10B, the protective layer 14 includes a surface layer 15 and an inner portion 16. Meanwhile, in the protective layer 14C, the surface layer 15 is not formed.

The member 12 that is a target to be covered may be composed of a porous ceramic or may be a dense member. The member 12 may be electrically conductive or may not be electrically conductive. The $Fe_3O_4$ phase has high electrical conductivity among metal oxides. It is thus preferred that the member 12 have electrical conductivity and the heat-resistant member 10 have electrical conductivity. The expression "electrically conductive" indicates the case where the electrical conductivity is $10^{-6}$ S/cm or more. The expression "not electrically conductive" indicates the case where the electrical conductivity is less than $10^{-6}$ S/cm.

The porous ceramic is not particularly limited as long as the ceramic is porous. Regarding the term "porous", the porous ceramic only need to have open pores on a surface. For example, the porous ceramic may have a porosity of 10% by volume or more. The porosity is preferably 20% by volume or more and more preferably 40% by volume or more. From the viewpoint of easy production, the porosity is preferably 90% by volume or less. The porosity of the porous ceramic may be appropriately selected, depending on its application and so forth. The average pore size of the porous ceramic is preferably in the range of, for example, 1 μm or more and 300 μm or less. In this range, the protective layer easily enters the pores of the porous ceramic and bonds strongly. The average pore size is more preferably 5 μm or more and still more preferably 10 μm or more. The average pore size is more preferably 100 μm or less and still more preferably 50 μm or less. The porosity and the average pore size of the porous ceramic are determined by results measured by mercury intrusion porosimetry.

The porous ceramic may contain one or more inorganic materials selected from carbides, such as silicon carbide, titanium carbide, zirconium carbide, and boron carbide, nitrides, such as silicon nitride, aluminum nitride, titanium nitride, and zirconium nitride, oxynitride, such as SIALON, silicides, such as molybdenum silicide, zirconium phosphate, and so forth. The porous ceramic may also contain one or more inorganic materials selected from cordierite, mullite, zeolite, aluminum titanate, aluminum oxide, zirconium oxide, titanium oxide, silicon oxide, magnesium oxide, and so forth. The shape of the porous ceramic is not particularly limited and may be selected, depending on the application. Examples thereof include plate-, cylinder-, and honeycomb-like shapes. A structure through which fluid can pass may also be used. Specifically, the porous ceramic may have a honeycomb structure including partition walls configured to form a plurality of cells serving as fluid channels.

The dense member is not particularly limited as long as it is a dense member having low porosity. For example, the dense member may be a metal member or may be composed of a dense ceramic. The dense member may have a porosity of, for example, 5% by volume or less. The porosity is preferably 1% by volume or less and more preferably 0.5% by volume or less. The metal member is not particularly limited as long as it is composed of a metal, for example, a representative metal or transition metal. For example, the metal member is preferably composed of a metal having high electrical conductivity. Among transition metals, a metal, for example, Fe, Co, Ni, or Cu, or an alloy thereof is preferred. A noble metal, for example, Pt or Au, may be used, depending on its application. The metal member may serve as an electrode. In this case, stainless steel, for example, a Cr—Ni—Fe-based alloy (SUS304) or a Cr—Fe-based alloy (SUS430), may be preferably used. The metal member is preferably composed of an alloy containing at least Fe and Cr and more preferably an alloy containing 70% by mass or more and less than 90% by mass of Fe and 10% by mass or more and less than 30% by mass of Cr because it is a stable material and has good electrical conductivity. The metal member may have a plate-like shape, and the shape of the metal member may be appropriately selected, depending on the application. For example, the dense ceramic may be a material produced by densely sintering one of the foregoing porous ceramic materials. The member of the dense ceramic may be a member composed of the porous ceramic having pores charged with a filler or an impregnating material, or a complex oxide member containing a plurality of metals. A specific example of the charged member is a Si-impregnated SiC sintered compact in which pores in porous SiC are impregnated with metallic Si. This material has good thermal conductivity and good electrical conductivity owing to metallic Si. Examples of the complex oxide member include electrically conductive ceramic materials, such as $LaCrO_3$-based materials, $BaTiO_3$-based materials, $LaMnO_3$-based materials, $LaCoO_3$-based materials, $NaCo_2O_4$-based materials, $Ca_3Co_4O_9$-based materials, $LaNiO_3$-based materials, and $SrTiO_2$-based materials. The expression "-based materials" is intended to include a material partially replaced with an element, e.g., an alkali metal element, an alkaline-earth metal, or an element having a different valence number. A specific example of the $LaMnO_3$-based materials is $(La_{0.9}Sr_{0.1})MnO_3$.

The oxide ceramic used to form the protective layer 14 may be composed of an Fe oxide in which one or more of Mn, Co, Ni, Cu, and Zn serving as solute components are solid-dissolved. These elements are capable of forming spinel-type oxides with Fe, are easily solid-dissolved in $Fe_3O_4$, and thus are preferred. Among these elements, Ni is preferred as a solute component.

The solute component is preferably solid-dissolved in the oxide ceramic in an amount of 0.5% by mass or more and 30% by mass or less, more preferably 1% by mass or more and 25% by mass or less, and still more preferably 1% by mass or more and 15% by mass or less. In these ranges, high heat resistance is also provided. Thus, these ranges are preferred.

Ni serving as the solute component may be solid-dissolved in the oxide ceramic, in which the peak shift of the (751) plane of $Fe_3O_4$ may be 0.02° or more, the peak shift being measured by X-ray diffraction with CuKα radiation. In this case, the oxide ceramic is thermally more stable. The peak shift is more preferably 0.05° or more and may be 0.1° or more.

The oxide ceramic may further contain an $Fe_2O_3$ phase in addition to the $Fe_3O_4$ phase, and Ni serving as the solute component may be solid-dissolved in the oxide ceramic, in which the peak shift of the (410) plane of $Fe_2O_3$ may be 0.02° or more, the peak shift being measured by X-ray diffraction with CuKα radiation. In this case, the oxide ceramic is thermally more stable. The peak shift is more preferably 0.04° or more and may be 0.05° or more.

The oxide ceramic may not contain the crystal phase of $Fe_2MO_4$ (where M represents a solute component). $Fe_2MO_4$ has low electrical conductivity. Thus, the presence of the crystal phase of $Fe_2MO_4$ is not preferred for a heat-resistant member having electrical conductivity.

The protective layer 14 may include the surface layer 15 composed of the $Fe_2O_3$ phase and the inner portion 16 composed of the $Fe_3O_4$ phase. In this case, the chemically and thermally stable $Fe_2O_3$ phase is located on the surface of the protective layer, so that, for example, the thermal stability of the $Fe_3O_4$ phase is easily maintained. The surface layer 15 may be denser than the inner portion 16. The surface layer 15 may have a porosity of 5% by volume or less. The surface layer 15 may be a crystal phase other than the $Fe_2O_3$ phase and may not be arranged on the surface exposed to outside air. In the protective layer 14, the surface layer 15 preferably has a thickness of 15 μm or less. The surface layer 15 may have a thickness of 10 μm or less or 8 μm or less. The thickness of the surface layer 15 may be appropriately selected from the viewpoint of thermally and chemically protecting the inner portion 16.

The oxide ceramic may contain Fe serving as a first component that is a metal serving as a main component; and one or more of Si, Zr, Ti, Sn, Nb, Sb, and Ta each serving as a second component. The second component may be a different component from the foregoing solute component in the $Fe_3O_4$ phase and may serve as an auxiliary component to the solute component. In the case where the protective layer contains the second component, the second component is also solid-dissolved in $Fe_3O_4$ in the oxide ceramic to increase the electrical conductivity. This further inhibits a reduction in electrical conductivity due to heating during operation, which is preferred. In the case where the protective layer contains the second component, the electrical resistance of the protective layer is further reduced. Thus, heat production is less likely to occur, which is preferred. The protective layer 14 may be produced by, for example, adding a compound containing the second component (also referred to as a "second compound") to a raw material containing the first component. The second compound may be used as a conductive aid. The second compound may be a carbonate, an oxide, a hydroxide, a chloride, or a nitrate. Of these, the second compound may be a carbonate or an oxide. Specific examples of the second compound include $TiO_2$, $SnO_2$, $Nb_2O_5$, $SiO_2$, and $ZrO_2$. The content of the second component is preferably, for example, 5% by mass or less and more preferably 2% by mass or less with respect to the protective layer produced.

The protective layer 14 may contain an oxide of the solute component. For example, in the case where the main component of the protective layer 14 is a $(Fe,Ni)_3O_4$ phase, NiO, which is an oxide of the solute component, may be present as a crystal phase. In the case where the main component of the protective layer 14 is $(Fe,Mn)_3O_4$, oxides, such as MnO, $MnO_2$, $Mn_2O_3$, and $Mn_3O_4$, may be present. In the protective layer 14, metallic Fe may be left.

In the heat-resistant member 10 including the electrically conductive member 12 covered with the protective layer 14, the protective layer 14 preferably has an electrical conductivity of $1 \times 10^{-1}$ (S/cm) or more. The protective layer 14 more preferably has an electrical conductivity of 1 (S/cm) or more and still more preferably 10 (S/cm) or more. At a higher electrical conductivity, the protective layer has superior electrical conductivity, thus leading to efficient use of electricity. However, the upper limit is about $10^3$ (S/cm) because of the structure of the material. The electrical conductivity may be determined by forming holes in parts of the protective layer 14, baking Ag electrodes on exposed portions, bringing probes into contact with the electrodes to measure the electrical resistance, converting the resulting resistance into volume resistivity using the area of the electrodes and the interelectrode distance, and calculating the reciprocal of the volume resistivity.

The protective layer according to the present invention has a porosity of 0% by volume or more and 5% by volume or less, preferably 4% by volume or less, and more preferably 3% by volume or less. The oxide ceramic is preferably formed of a dense body from a strength point of view. The protective layer preferably has a porosity of 0.5% by volume or more and more preferably 1% by volume or more. The oxide ceramic preferably has pores from the viewpoint of stress relaxation. A method for calculating the porosity of the oxide ceramic will be described. A microstructure image captured by a SEM is subjected to image analysis using image analysis software to determine the porosity of the oxide ceramic. A portion, having an area of $0.5 \times 10^{-6}$ $m^2$, of the oxide ceramic of the protective layer is randomly selected and binarized to distinguish between pores and the oxide ceramic. Conditions of the binarization are appropriately set, depending on the resulting image. For example, values obtained empirically are used. In the binarized image, the oxide ceramic and the pores are separated, and the area ratio thereof is calculated to determine the porosity. The area ratio in a cross section is almost equivalent to the volume ratio, and thus the porosity is determined in units of % by volume.

The heat-resistant member 10 according to the present invention preferably has high adhesion between the member 12 and the protective layer 14. The expression "high adhesion" indicates that no delamination or cracking is observed at the interface between the member 12 and the protective layer 14. A method for evaluating the adhesion will be described. The heat-resistant member is embedded in a resin and polished to a substantially mirror-finished surface with diamond slurry or the like to produce an observation sample. The sample is then observed with a scanning electron microscope (SEM) at a magnification of ×1500 or more to check the delamination between the member 12 and the protective layer 14 and cracking in the member 12 and the protective layer 14. The adhesion between the member 12 and the protective layer 14 is evaluated on the basis of the checking results.

The heat-resistant member 10 is not particularly limited as long as it has a structure in which the protective layer 14 is arranged on a surface of the member 12. The heat-resistant member may be used for honeycomb structures, thermoelectric elements, ceramic heaters, gas detectors for oxygen and NOx, and so forth. For example, among honeycomb structures, the heat-resistant member is suitably used for a honeycomb structure heated by applying a voltage to a metal member.

A method for producing a heat-resistant member according to the present invention will be described below. The method for producing a heat-resistant member according to the present invention may include, for example, disposing a material on the whole or part of a surface of a member, the material containing an Fe metal powder and a solute component powder that contains a solute component capable of forming a spinel-type oxide with Fe, and performing firing in a temperature range lower than the melting point of an Fe oxide to form a protective layer composed of an oxide ceramic.

(Protective Layer Formation Step)

As the material used for the protective layer, the Fe metal powder and the solute component powder that contains a solute component capable of forming a spinel-type oxide with Fe are exemplified. As the solute component, one or more of Mn, Co, Ni, Cu, and Zn are exemplified. The solute component may be in the form of, for example, a metal powder or an oxide powder containing the solute component. Regarding an Fe material, an Fe oxide is not suitable as a material for the protective layer because the adhesion strength of the Fe oxide to the member is not sufficient even when heat treatment is performed. The material powder used preferably has an average particle diameter of, for example, 1 μm or more and 40 μm or less. In this range, suitable adhesion strength is easily provided. The material for the protective layer preferably has an average particle diameter of 30 μm or less, more preferably 10 μm or less, and still more preferably 5 μm or less. The average particle diameter is more preferably 3 μm or more. The average particle diameter of the material particles indicates a median diameter (D50) measured with a laser diffraction/scattering particle size distribution analyzer using water as a dispersion medium.

In this step, preferably, a plurality of material powders having different particle sizes are mixed together to prepare a material powder for the protective layer. This enhances the adhesion strength of the protective layer. The Fe metal powder may be a mixture of a first powder having a predetermined average particle diameter (μm) and a second powder having a larger average particle diameter (μm) than the predetermined average particle diameter. The second powder is preferred in order to improve the strength of the protective layer itself. The first powder may have an average particle diameter of 0.1 to 10 (μm). The second powder may have an average particle diameter of 10 to 100 (μm). For example, the amount of the solute component added is preferably 0.5% by mass or more, more preferably 1% by mass or more, and still more preferably 2% by mass or more with respect to the entire protective layer. The amount of the solute component added is preferably 30% by mass or less, more preferably 25% by mass or less, and still more preferably 15% by mass or less with respect to the entire protective layer.

In this step, the member on which the material has been formed may be fired in air or may be subjected to heat treatment in a non-oxidizing atmosphere and then fired in air. Examples of the non-oxidizing atmosphere include a nitrogen atmosphere and noble gas atmospheres (Ar and He). Each of the heating temperature and the firing temperature needs to be in a temperature range lower than the melting point of an Fe oxide and is preferably 400° C. or higher and 900° C. or lower. In this temperature range, the metallic Fe can be oxidized to form the oxide ceramic. The firing temperature is set to an appropriate range, depending on the material of the protective layer. The firing temperature is preferably 500° C. or higher and more preferably 600° C. or higher. The firing temperature is preferably 850° C. or lower and more preferably 800° C. or lower. The firing temperature is preferably a higher temperature from the viewpoint of sufficient oxidization. The firing temperature is preferably a lower temperature from the viewpoint of energy consumption. The firing treatment can be performed in a convenient atmosphere, i.e., air, at a low temperature of 900° C. or lower. In this step, the firing is performed in such a manner that the oxide ceramic preferably has a porosity of 5% by volume or less, more preferably 4% by volume or less, and still more preferably 3% by volume or less. The oxide ceramic is preferably formed of a dense body from a strength point of view. In this step, the firing is performed in such a manner that the oxide ceramic preferably has a porosity of 0.5% by volume or more, more preferably 10% by volume or more, and still more preferably 20% by volume or more. The oxide ceramic preferably has pores from the viewpoint of stress relaxation.

In this step, the surface layer containing the $Fe_2O_3$ phase may be formed in the protective layer. The surface layer may be formed by, for example, a method described below. The material powder for the protective layer is formed into a paste. The resulting material paste is disposed on the member and fired at 750° C. for a holding time of 1 hour in air to form a two-layer structure including a surface layer and an inner portion. The thickness of the surface layer can be controlled by the firing temperature and the holding time. A higher temperature results in a thicker surface layer. A longer holding time results in a thicker surface layer. Specifically, when the material paste has a thickness of 300 μm, the firing temperature is preferably 1000° C. or lower. At 1000° C. or lower, excessive oxidation that leads to the failure of formation of the two-layer structure is inhibited. The firing temperature is preferably 300° C. or higher. At 300° C. or higher, oxidation proceeds sufficiently. In the case where the firing is performed in a typical air furnace, the holding time of the firing is preferably 24 hours or less. At more than 24 hours, the growth of the surface layer is substantially stopped. Thus, the holding time is preferably equal to or less than 24 hours and is preferably set in light of production cost and physical distribution. The holding time is preferably 10 minutes or more. At 10 minutes or more, the surface layer is sufficiently formed. Alternatively, the following method for forming a surface layer may be employed: For example, a material paste is disposed on a member and fired at 750° C. for a holding time of 1 hour in Ar to provide a single $Fe_3O_4$ phase. Subsequently, the temperature is held at 750° C. for a holding time of 0.5 hours in air to form a surface layer. The thickness of the surface layer can be controlled by the firing temperature and the holding time in air. As with the case described above, the firing temperature in air is preferably in the range of 300° C. or higher and 1000° C. or lower.

In this step, a compound (second compound) containing a second component that is a metal element is preferably added to the material powder for the protective layer in addition to the first component that is a metal serving as a main component. The second compound may be used as a conductive aid. Examples of the second compound include $TiO_2$, $SnO_2$, $Nb_2O_5$, $SiO_2$, and $ZrO_2$.

In the heat-resistant member and the method for producing the heat-resistant member according to the embodiments as described above, the member is covered with the oxide ceramic containing the $Fe_3O_4$ phase in which the solute component capable of forming a spinel-type oxide with Fe is solid-dissolved. In the oxide ceramic, $Fe_3O_4$ is thermally stable owing to the solute component. This further reduces the changes in the properties of the member and the protective layer. In the method for producing the heat-resistant member, the metallic Fe powder and the solute component powder containing the solute component capable of forming a spinel-type oxide with Fe are disposed on the member and fired. It is thus possible to produce the heat-resistant member covered with the protective layer by the simpler method.

The present invention is not limited to the foregoing embodiments. It should be appreciated that the present invention can be implemented in numerous ways without departing from the technical scope of the present invention.

Examples

Examples of the specific production of a heat-resistant member according to the present invention will be described below as Experimental Examples. Experimental Examples 4 to 7 and 9 to 16 correspond to the examples of the present invention. Experimental Examples 1 to 3 and 8 correspond to comparative examples.

Production Method

A metallic powder of Fe, a metallic powder or an oxide powder of any one of Ni, Mn, Co, Cu, and Zn, a polyvinyl butyral resin (PVB) serving as a binder, and terpineol serving as a solvent were mixed together to prepare a protective layer paste. For the metallic Fe powder as a material, a mixture of a powder (fine particles) having an average particle diameter of 3 µm and a powder (coarse particles) having an average particle diameter of 35 µm mixed in an appropriate mixing ratio was used. The protective layer paste was applied onto a member that is a target to be protected by covering and was allowed to stand overnight at 80° C. in air to sufficiently dry terpineol. The resulting sample was fired at 200° C. to 800° C. in air (protective layer formation). Regarding the firing environment, an air atmosphere or a non-oxidizing atmosphere was used. When heat treatment was performed in the non-oxidizing atmosphere (Ar), firing was subsequently performed at 200° C. to 800° C. in air.

Production of Member

A Si-bonded SiC sintered compact was produced as a porous ceramic. As a raw material for the porous ceramic of the Si-bonded SiC sintered compact, a SIC powder and a metallic Si powder were mixed together in a volume ratio of 38:22 to prepare a "powder mixture". Hydroxypropyl methylcellulose serving as a binder, starch serving as a pore-forming agent, and a water absorbent resin were added to the "powder mixture" together with water to prepare a raw material for a porous material (molding material). The molding material was kneaded to a cylindrical green body. The cylindrical green body was subjected to extrusion molding with an extruder to produce a honeycomb-formed article. The formed article was dried at 120° C. in an air atmosphere to produce a dry article. The dry article was degreased at 450° C. in an air atmosphere and then fired at 1450° C. for 2 hours in an Ar atmosphere under atmospheric pressure. A rectangular parallelepiped sample with dimensions of 10×20×35 mm was cut from the resulting honeycomb-formed porous ceramic to obtain a base (porous ceramic). The base had a porosity of 40% by volume, which was measured by mercury intrusion porosimetry with a mercury porosimeter (Autopore IV 9520, manufactured by Micrometrics), and an average pore size of 10 µm, which was measured in the same way as above.

As dense ceramics, a Si-impregnated SIC sintered compact in which a SiC sintered compact was impregnated with metallic Si and a ceramic material of $LaCrO_3$, which is a complex oxide, were produced. Regarding the Si-impregnated SiC sintered compact, hydroxypropyl methylcellulose serving as a binder, starch serving as a pore-forming agent, and a water absorbent resin were added to a SiC powder serving as a raw material together with water to prepare a raw material for a porous material (molding material). A cylindrical green body produced by kneading the molding material was subjected to extrusion molding with an extruder to produce a bar-formed article (10×20×35 mm). The formed article was dried at 120° C. in an air atmosphere, degreased at 450° C. in an air atmosphere, and fired at 1450° C. for 2 hours in an Ar atmosphere under atmospheric pressure. The resulting porous ceramic was impregnated with metallic Si to produce a base (dense ceramic). The impregnation treatment was performed as follows: Pellets composed of metallic Si were placed on the porous ceramic and exposed to a temperature of 1500° C. in a reduced-pressure atmosphere. The porous ceramic was impregnated with the metallic Si by capillarity. Subsequently, Ar was introduced thereinto to atmospheric pressure. Cooling was performed to provide the Si-impregnated SiC sintered compact. The base had a porosity of 0.1% by volume or less, which was measured by mercury intrusion porosimetry with a mercury porosimeter. Regarding $LaCrO_3$, equimolar amounts of lanthanum oxide and chromium oxide were mixed together. The mixture was subjected to press molding to produce a bar-formed article (10×20×35 mm). The formed article was fired at 1600° C. for 2 hours in an air atmosphere to produce a sintered compact. Each of the Si-impregnated SiC sintered compact and the complex oxide member had a porosity of 0.1% by volume or less, which was measured by mercury intrusion porosimetry with a mercury porosimeter.

Furthermore, a member composed of a stainless steel material (SUS) was prepared. As the stainless steel material, a Cr—Fe-based alloy (SUS430) was used. The metal member was cut into a bar with dimensions of 3×4×20 mm and used for experiments. The metal member had a porosity of 0.1% by volume or less, which was measured by mercury intrusion porosimetry with a mercury porosimeter.

Experimental Examples 1 to 16

In Experimental Examples 1 to 16, production was performed under conditions listed in Table 1. In Experimental Example 1, the protective layer was not formed. In Experimental Examples 2 to 8, Ni serving as a solute component was added in different mixing proportions. In Experimental Example 9, a metallic Ni powder was used as a Ni source. In Experimental Examples 10 to 13, solute components other than Ni were used. In Experimental Examples 14 to 16, different members were used.

(Identification of Crystal Phase and Calculation of Peak Shift)

X-ray diffraction patterns of the protective layers were measured with a rotating anode X-ray diffractometer (RINT, manufactured by Rigaku Corporation). Conditions of the X-ray diffraction measurement were as follows: CuKα radiation source, 50 kV, 300 mA, 2θ=40° to 120°. The measurement was performed using a Si-containing powder as an internal standard. A peak corresponding to the Si(220) plane was used as a reference peak. The amount of peak shift of the measurement sample was calculated and used as an index of the solid solubility of a heterogeneous element. Regarding the amount of peak shift, a peak corresponding to the (410) plane of $Fe_2O_3$ and a peak corresponding to the (751) plane of $Fe_3O_4$ were used. FIG. 4 illustrates the results of the X-ray diffraction measurement in Experimental Examples 3 and 4.

(Electrical Conductivity of Heat-Resistant Member)

Holes each having a diameter of 5 mm were formed in portions of the protective layer of the heat-resistant member. Ag electrodes each having a diameter of 3 mm were baked on the exposed portions. The electrical resistance was measured by bringing probes into contact with the electrodes. The resulting resistance was converted into volume resistivity using the area of the electrodes and the interelectrode distance. The reciprocal of the volume resistivity was calculated to determine the electrical conductivity.

(Heat Resistance Test)

The heat-resistant members were subjected to a heat resistance test. The foregoing heat-resistant members were held at 800° C. for 24 hours in air. The heat-treated heat-resistant members were subjected to electrical conductivity measurement and appearance evaluation.

(Evaluation of Oxidation Resistance)

The comprehensive evaluation of each sample was performed on the basis of the measurement results. A sample in which the electrical conductivity was 10 S/cm or more before and after the heat resistance test and in which a crack and so forth were not formed after the heat resistance test was rated as "A". A sample in which the electrical conductivity was 0.1 S/cm or more and less than 10 S/cm before and after the heat resistance test and in which a crack and so forth were not formed after the heat resistance test was rated as "B". A sample in which a crack and so forth were formed in the heat resistance test was rated as "D".

(oxide ceramics), the amounts of peak shift, the thickness and the porosity of the surface layers, the initial properties, the materials and the properties after the heat resistance test, and the evaluation of the oxidation resistance. As listed in Table 2, in Experimental Examples 4 to 7 and 9 to 16 in which the peak corresponding to the $Fe_3O_4$ phase shifted (the solute components were solid-dissolved) and in which the $Fe_2MO_4$ phase was not contained, the electrical conductivity and the heat resistance were satisfactory. Here, the results demonstrated that the members that are targets to be

TABLE 1

| | | Raw Material of Protective Layer/mass % | | | | | | | | | |
|---|---|---|---|---|---|---|---|---|---|---|---|
| | | Fe | | | | | | | | | Firing |
| EXAMPLE | Member to be Protected | Fine Particle | Coarse Particle | NiO | Ni | CuO | ZnO | MnO | CoO | Total | Firing Environment | Temperature ° C. |
| 1 | SUS | No Protective Layer | | | | | | | | | — | — |
| 2 | | 60 | 40 | | | | | | | 100 | Air | 750 |
| 3 | | 60 | 40 | | | | | | | 100 | Ar | 750 |
| 4 | | 39.797 | 59.6954 | 0.5 | | | | | | 100 | Air | 750 |
| 5 | | 39.2 | 58.8 | 2.0 | | | | | | 100 | | 750 |
| 6 | | 37.4 | 56.1 | 6.6 | | | | | | 100 | | 750 |
| 7 | | 34.8 | 52.2 | 12.9 | | | | | | 100 | | 750 |
| 8 | | 26.6 | 40.0 | 33.4 | | | | | | 100 | | 750 |
| 9 | | 39.28 | 58.92 | | 1.8 | | | | | 100 | | 750 |
| 10 | | 58.8 | 39.2 | | | 2 | | | | 100 | | 750 |
| 11 | | 58.8 | 39.2 | | | | 2 | | | 100 | | 750 |
| 12 | | 58.8 | 39.2 | | | | | 2 | | 100 | | 750 |
| 13 | | 58.8 | 39.2 | | | | | | 2 | 100 | | 750 |
| 14 | Si-bonded SiC | 39.2 | 58.8 | 2.0 | | | | | | 100 | | 750 |
| 15 | Si-impregnated SiC | 39.2 | 58.8 | 2.0 | | | | | | 100 | | 750 |
| 16 | $LaCrO_3$ | 39.2 | 58.8 | 2.0 | | | | | | 100 | | 750 |

(Results and Discussion)

Table 2 lists the measurement results of Experimental Examples 1 to 16. Table 2 lists the crystal phases of the surface layers and the inner portions of the protective layers protected may be composed of the porous ceramics or the dense bodies. The results also demonstrated that in the case where Cu, Zn, Mn, Co, or the like other than Ni was used as the solute component, good results were obtained.

TABLE 2

| | Material of Protective Layer | | | | | | | Initial Properties | |
|---|---|---|---|---|---|---|---|---|---|
| | | Crystal Phase[1] | | Amount of Peak Shift ° | | Thickness of Surface Layer | Porosity of Surface Layer | Electrical | |
| EXAMPLE | Constituting Component | Surface Layer | Internal Portion | $Fe_3O_4$ | $Fe_2O_3$ | μm | % | Conductivity S/cm | Cracks and Delamination |
| 1 | | | No Protective Layer | | | | | >1.0E+6 | |
| 2 | Fe, O | A | B | | | None | | 5.0E−01 | None |
| 3 | Fe, O | B | B | | | None | | 1.6E+00 | None |
| 4 | Fe, Ni, O | C | D | 0.028 | 0.000 | 14.3 | 2.50 | 3.3E+00 | None |
| 5 | Fe, Ni, O | C | D | 0.060 | 0.022 | 5.9 | 0.41 | 1.5E+01 | None |
| 6 | Fe, Ni, O | C | D | 0.101 | 0.040 | 7.7 | 0.51 | 5.6E+01 | None |
| 7 | Fe, Ni, O | C | D | 0.203 | 0.050 | 8.0 | 0.48 | 3.3E+01 | None |
| 8 | Fe, Ni, O | A, D, E | | 0.218 | 0.048 | None | None | 1.3E−02 | None |
| 9 | Fe, Ni, O | C | D | 0.054 | 0.023 | 4.8 | 0.60 | 2.6E+01 | None |
| 10 | Fe, Cu, O | F | G | 0.061 | 0.031 | 5.0 | 0.62 | 2.6E+01 | None |
| 11 | Fe, Zn, O | F | G | 0.058 | 0.028 | 5.1 | 0.58 | 2.8E+01 | None |
| 12 | Fe, Mn, O | F | G | 0.050 | 0.021 | 4.8 | 0.60 | 2.2E+01 | None |
| 13 | Fe, Co, O | F | G | 0.051 | 0.022 | 5.3 | 0.61 | 2.4E+01 | None |
| 14 | Fe, Ni, O | C | D | 0.058 | 0.021 | 6.1 | 0.39 | 5.0E−02 | None |
| 15 | Fe, Ni, O | C | D | 0.061 | 0.025 | 5.8 | 0.41 | 1.7E+01 | None |
| 16 | Fe, Ni, O | C | D | 0.056 | 0.023 | 5.9 | 0.40 | 1.5E+01 | None |

TABLE 2-continued

| | Material After Heat Resistance Test | | | Properties After Heat Resistance Test | | |
|---|---|---|---|---|---|---|
| | Crystal Phase of Protective Layer | | Thickness of | Electrical | | |
| EXAMPLE | Surface Layer | Internal Portion | Surface Layer μm | Conductivity S/cm | Cracks and Delamination | Oxidation Resistance |
| 1 | No Protective Layer | | | <1.0E−06 | Present | D |
| 2 | A | A | None | 2.2E−05 | Present | D |
| 3 | A | A | None | 9.5E−04 | Present | D |
| 4 | C | D | 14.3 | 3.6E+00 | None | B |
| 5 | C | D | 5.9 | 1.5E+01 | None | A |
| 6 | C | D | 7.7 | 5.0E+01 | None | A |
| 7 | C | D | 8.0 | 3.6E+01 | None | A |
| 8 | A, E | | None | 1.0E−06 | Present | D |
| 9 | C | D | 4.8 | Unchanged | None | A |
| 10 | F | G | 5.1 | 2.4E+01 | None | A |
| 11 | F | G | 4.6 | 2.2E+01 | None | A |
| 12 | F | G | 5.0 | 6.4E−01 | None | A |
| 13 | F | G | 5.0 | 6.4E−01 | None | A |
| 14 | C | D | 6.1 | 1.8E+01 | None | A |
| 15 | C | D | 5.8 | 1.5E+01 | None | A |
| 16 | C | D | 5.9 | 1.6E+01 | None | A |

1) A: $Fe_2O_3$, B: $Fe_3O_4$, C: $(Fe,Ni)_2O_3$, D: $(Fe,Ni)_3O_4$, E: $Fe_2NiO_4$ F: $(Fe,M)_2O_3$, G: $(Fe,M)_3O_4$ (where M is any of Cu, Zn, Mn, and Co)
2) E+6 represents $10^6$ and E−6 represents $10^{-6}$ It should be appreciated that the present invention is not limited to the foregoing examples and can be implemented in numerous ways without departing from the technical scope of the present invention.

What is claimed is:

1. A heat-resistant member, comprising:
a member; and
a protective layer arranged on the whole or part of a surface of the member, the protective layer including an oxide ceramic containing an $Fe_3O_4$ phase in which a solute component capable of forming a spinel-type oxide with Fe is solid-dissolved.

2. The heat-resistant member according to claim 1, wherein the oxide ceramic is composed of an Fe oxide in which one or more of Mn, Co, Ni, Cu, and Zn each serving as the solute component are solid-dissolved.

3. The heat-resistant member according to claim 1, wherein the solute component is solid-dissolved in the oxide ceramic in an amount of 0.5% by mass or more and 30% by mass or less.

4. The heat-resistant member according to claim 1, wherein Ni serving as the solute component is solid-dissolved in the oxide ceramic, and a peak shift of the (751) plane of $Fe_3O_4$ is 0.02° or more, the peak shift being measured by X-ray diffraction with CuKα, radiation.

5. The heat-resistant member according to claim 1, wherein the oxide ceramic further contains an $Fe_2O_3$ phase, Ni serving as the solute component is solid-dissolved in the oxide ceramic, and a peak shift of the (410) plane of $Fe_2O_3$ is 0.02° or more, the peak shift being measured by X-ray diffraction with CuKα radiation.

6. The heat-resistant member according to claim 1, wherein the protective layer includes a surface layer composed of an $Fe_2O_3$ phase and an inner portion composed of the $Fe_3O_4$ phase.

7. The heat-resistant member according to claim 6, wherein in the protective layer, the surface layer has a thickness of 15 μm or less.

8. The heat-resistant member according to claim 1, wherein the protective layer has an electrical conductivity of $1\times10^{-1}$ (S/cm) or more.

9. A method for producing a heat-resistant member, comprising a protective layer formation step of disposing a material on the whole or part of a surface of a member, the material containing an Fe metal powder and a solute component powder that contains a solute component capable of forming a spinel-type oxide with Fe, and performing firing in a temperature range lower than the melting point of an Fe oxide to form a protective layer composed of an oxide ceramic.

10. The method for producing a heat-resistant member according to claim 9, wherein in the protective layer formation step, the protective layer is formed by firing the member on which the material has been disposed in air or by subjecting the member on which the material has been disposed to heat treatment in a non-oxidizing atmosphere and then performing firing in air.

11. The heat-resistant member according to claim 1, wherein the oxide ceramic is composed of an Fe oxide in which one or more of Mn, Co, Ni, Cu, and Zn each serving as the solute component are solid-dissolved, and the solute component is solid-dissolved in the oxide ceramic in an amount of 0.5% by mass or more and 30% by mass or less.

12. The heat-resistant member according to claim 1, wherein the oxide ceramic is composed of an Fe oxide in which one or more of Mn, Co, Ni, Cu, and Zn each serving as the solute component are solid-dissolved, and the solute component is solid-dissolved in the oxide ceramic in an amount of 0.5% by mass or more and 30% by mass or less, and
the protective layer includes a surface layer composed of an $Fe_2O_3$ phase and an inner portion composed of the $Fe_3O_4$ phase.

* * * * *